(12) United States Patent
Shen et al.

(10) Patent No.: US 7,676,637 B2
(45) Date of Patent: Mar. 9, 2010

(54) LOCATION-AWARE CACHE-TO-CACHE TRANSFERS

(75) Inventors: Xiaowei Shen, Hopewell Junction, NY (US); Jaehyuk Huh, Austin, TX (US); Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1157 days.

(21) Appl. No.: 10/833,197

(22) Filed: Apr. 27, 2004

(65) Prior Publication Data

US 2005/0240735 A1   Oct. 27, 2005

(51) Int. Cl.
*G06F 12/00* (2006.01)
(52) U.S. Cl. ...................... 711/144; 711/145
(58) Field of Classification Search ............ None
See application file for complete search history.

(56) References Cited

U.S. PATENT DOCUMENTS

| | | | |
|---|---|---|---|
| 6,253,292 B1 * | 6/2001 | Jhang et al. ............ 711/146 |
| 6,389,513 B1 * | 5/2002 | Closson ................. 711/129 |
| 6,484,220 B1 * | 11/2002 | Alvarez et al. ............ 710/46 |
| 6,516,391 B1 * | 2/2003 | Tsushima et al. .......... 711/146 |
| 6,604,060 B1 * | 8/2003 | Ryan et al. .............. 702/186 |
| 6,701,416 B1 * | 3/2004 | Arimilli et al. ........... 711/141 |
| 7,100,001 B2 * | 8/2006 | Edirisooriya et al. ...... 711/147 |
| 2005/0251626 A1 * | 11/2005 | Glasco ................. 711/133 |

* cited by examiner

*Primary Examiner*—Matt Kim
*Assistant Examiner*—Kaushikkumar Patel
(74) *Attorney, Agent, or Firm*—F. Chau & Associates, LLC (57) ABSTRACT

In shared-memory multiprocessor systems, cache interventions from different sourcing caches can result in different cache intervention costs. With location-aware cache coherence, when a cache receives a data request, the cache can determine whether sourcing the data from the cache will result in less cache intervention cost than sourcing the data from another cache. The decision can be made based on appropriate information maintained in the cache or collected from snoop responses from other caches. If the requested data is found in more than one cache, the cache that has or likely has the lowest cache intervention cost is generally responsible for supplying the data. The intervention cost can be measured by performance metrics that include, but are not limited to, communication latency, bandwidth consumption, load balance, and power consumption.

75 Claims, 4 Drawing Sheets

LOCATION-AWARE CACHE-TO-CACHE TRANSFERS

BACKGROUND OF THE INVENTION

1. Field of the Invention

The present invention relates to computer-based memory systems, and, more particularly, location-aware cache-to-cache transfers.

2. Description of the Related Art

A symmetric multiprocessor ("SMP") system generally employs a snoopy mechanism to ensure cache coherence. When a cache miss occurs, the requesting cache may send a cache request to the memory and all its peer caches. When a peer cache receives the cache request, it snoops its cache directory and produces a cache snoop response indicating whether the requested data is found and the state of the corresponding cache line. If the requested data is found in a peer cache, the peer cache can source the data to the requesting cache via a cache-to-cache transfer. The memory is responsible for supplying the requested data if the data cannot be supplied by any peer cache.

For purposes of this disclosure, a cache-to-cache transfer is referred to as a cache intervention. In a cache intervention, the cache that requests data is referred to as the requesting cache, and the cache that supplies data is referred to as the supplying cache or the sourcing cache. A cache is said to have intervention responsibility for a memory address to a peer cache, if the cache is responsible for supplying requested data of the memory address to the peer cache.

Figure 1:
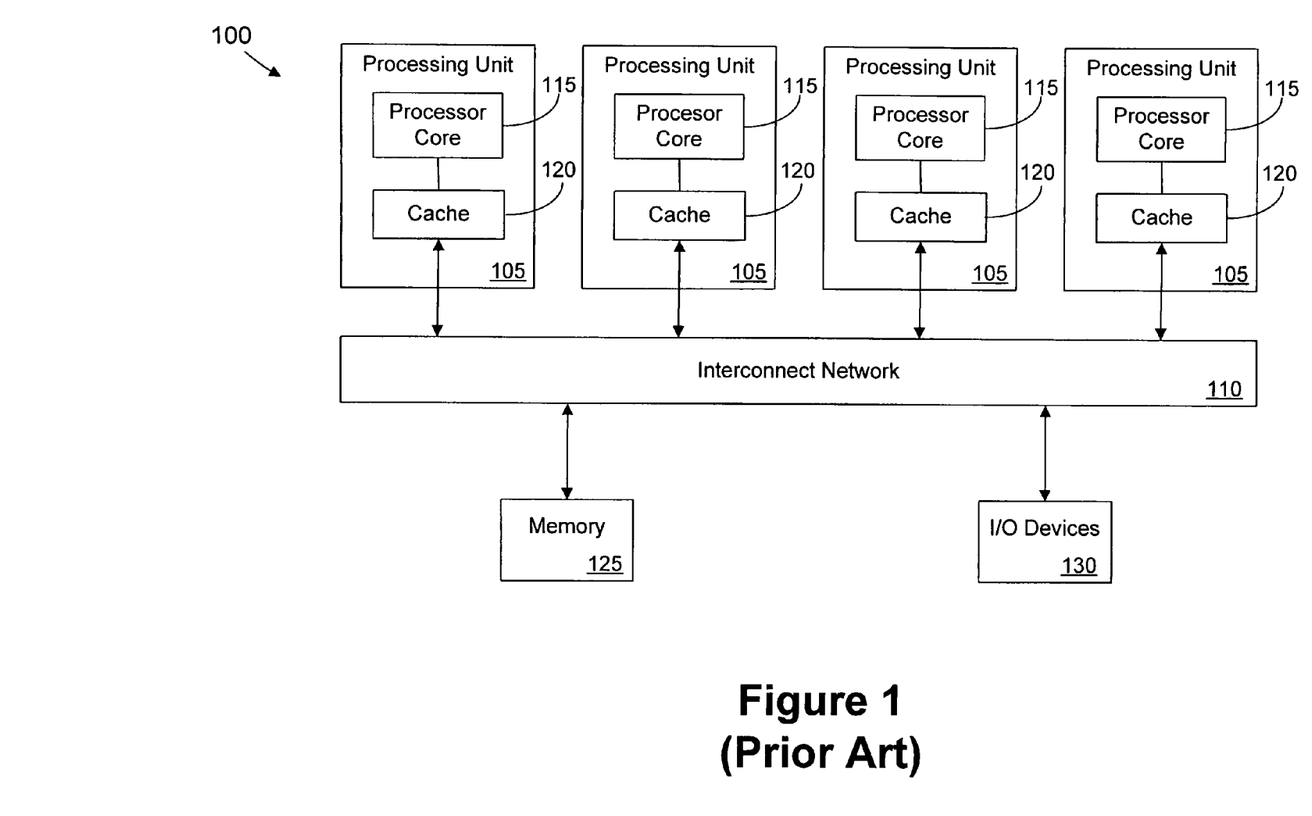
FIG. 1 shows a typical SMP system that includes a number of processing units connected via an interconnect network, wherein each processing unit includes a processor core and a cache.

Referring now to FIG. 1, an exemplary SMP system 100 is shown that includes multiple processing units 105 interconnected via an interconnect network 110. Each processing unit 105 includes a processor core 115 and a cache 120. Also connected to the interconnect network 110 are a memory 125 and some I/O devices 130. The memory 125 can be physically distributed into multiple memory portions, wherein each memory portion is operatively associated with a processing unit 105. The interconnect network 110 serves at least two purposes: (1) sending cache coherence requests to the caches 120 and the memory 125; and (2) transferring data among the caches 120 and the memory 125. The interconnect network 110 can employ different physical networks for different purposes. For example, an SMP system can broadcast a cache request via direct point-to-point communication channels, and transfer data via a message-passing network such as a mesh or torus network.

There are many techniques for achieving cache coherence that are known to those skilled in the art. A number of snoopy cache coherence protocols have been proposed. The MESI coherence protocol and its variations have been widely used in SMP systems. As the name suggests, MESI has four cache states, modified (M), exclusive (E), shared (S) and invalid (I).

- I (invalid): The data is not valid. This is the initial state or the state after a snoop invalidate hit.
- S (shared): The data is valid, and can also be valid in other caches. This state is entered when the data is sourced from the memory or another cache in the modified state, and the corresponding snoop response shows that the data is valid in at least one of the other caches.
- E (exclusive): The data is valid, and has not been modified. The data is exclusively owned, and cannot be valid in another cache. This state is entered when the data is sourced from the memory or another cache in the modified state, and the corresponding snoop response shows that the data is not valid in another cache.
- M (modified): The data is valid and has been modified. The data is exclusively owned, and cannot be valid in another cache. This state is entered when a store operation is performed on the cache line.

With the MESI protocol, when a cache miss occurs, if the requested data is found in another cache and the cache line is in the modified state, the cache with the modified data supplies the data via a cache intervention, and writes the most up-to-date data back to the memory. However, if the requested data is found in another cache and the cache line is in the shared state, the cache with the shared data does not supply the requested data. In this case, the memory needs to supply the data to the requesting cache.

In modern SMP systems, when a cache miss occurs, if the requested data is found in both the memory and a cache, supplying the requested data to the requesting cache via a cache intervention is often preferred over supplying the requested data to the requesting cache from the memory, because cache-to-cache transfer latency is usually smaller than memory access latency. Furthermore, when caches are on the same die or in the same package module, there is usually more bandwidth available for cache-to-cache transfers, compared with the bandwidth available for off-chip DRAM accesses.

The IBM® Power 4 system, for example, enhances the MESI coherence protocol to allow more cache interventions. Compared with MESI, an enhanced coherence protocol allows data of a shared cache line to be sourced via a cache intervention. In addition, if data of a modified cache line is sourced from one cache to another, the modified data does not have to be written back to the memory immediately. Instead, a cache with the most up-to-date data can be held responsible for memory update when it becomes necessary to do so. An exemplary enhanced MESI protocol employing seven cache states is as follows.

- I (invalid): The data is invalid. This is the initial state or the state after a snoop invalidate hit.
- SL (shared, can be sourced): The data is valid, and may also be valid in other caches. The data can be sourced to another cache in the same module via a cache intervention. This state is entered when the data is sourced from another cache or from the memory.
- S (shared): The data is valid, and may also be valid in other caches. The data cannot be sourced to another cache. This state is entered when a snoop read hit occurs on a cache line in the SL state.
- M (modified): The data is valid, and has been modified. The data is exclusively owned, and cannot be valid in another cache. The data can be sourced to another cache. This state is entered when a store operation is performed on the cache line.
- Me (exclusive): The data is valid, and has not been modified. The data is exclusively owned, and cannot be valid in another cache.
- Mu (unsolicited modified): The data is valid, and is considered to have been modified. The data is exclusively owned, and cannot be valid in another cache.
- T (tagged): The data is valid, and has been modified. The modified data has been sourced to another cache. This state is entered when a snoop read hit occurs on a cache line in the M state.

When data of a memory address is shared in multiple caches in a single module, the module can include at most one cache in the SL state. The cache in the SL state is responsible for supplying the shared data via a cache intervention when a cache miss occurs in another cache in the same module. At any time, the particular cache that can source the requested data is fixed, regardless of which cache has issued the cache request. When data of a memory address is shared in more than one module, each module can include a cache in the SL state. A cache in the SL state can source the data to another cache in the same module, but cannot source the data to a cache in a different module.

In systems in which a cache-to-cache transfer can take multiple message-passing hops, sourcing data from different caches can result in different communication latency and bandwidth consumption. When a cache miss occurs in a requesting cache, if requested data is found in more than one peer cache, a peer cache that is closest to the requesting cache is preferred to supply the requested data to reduce communication latency and bandwidth consumption of cache intervention.

Thus, it is generally desirable to enhance cache coherence mechanisms with cost-conscious cache-to-cache transfers to improve overall performance in SMP systems.

SUMMARY OF THE INVENTION

In one aspect of the present invention, a system of location-aware cache intervention in a computer system is presented. The system comprises a plurality of caches, comprising a first cache and at least one other cache; wherein the first cache maintains intervention information for at least one memory address, the intervention information indicating for which of the at least one other cache the first cache has intervention responsibility.

In a second aspect of the present invention, a system of location-aware cache intervention in a computer system is presented. The system comprises a plurality of cache clusters, comprising a first cache cluster and at least one other cache cluster; wherein each of the plurality of cache clusters comprises at least one cache, the first cache cluster comprises a first cache; and wherein the first cache maintains intervention information for at least one memory address, the intervention information indicating for which of the at least one other cache cluster the first cache has intervention responsibility.

In a third aspect of the present invention, a system of location-aware cache intervention in a computer system is presented. The system comprises a plurality of caches, comprising a first cache and at least one other cache; wherein the first cache maintains location information for at least one memory address, the location information for a memory address in the at least one memory address indicating in which of the at least one other cache data of the memory address is cached or likely to be cached.

In a fourth aspect of the present invention, a system of location-aware cache intervention in a computer system is presented. The system comprises a plurality of cache clusters, comprising a first cache cluster and at least one other cache cluster; wherein each of the plurality of cache clusters comprises at least one cache, the first cache cluster comprises a first cache; and wherein the first cache maintains location information for at least one memory address, the location information for a memory address in the at least one memory address indicating in which of the at least one other cache cluster data of the memory address is cached or likely to be cached.

In a fifth aspect of the present invention, a system for location-aware cache intervention is presented. The system comprises a plurality of caches, comprising a first cache, a second cache and at least one other cache; wherein if the first cache receives a data request from the second cache, the first cache supplies requested data if the first cache has the requested data, and snoop responses from the at least one other cache indicate that the cache intervention cost of supplying the data from the first cache to the second cache is lower than the cache intervention cost of supplying the data from any of the at least one other cache to the second cache.

In a sixth aspect of the present invention, a method of location-aware cache intervention in a computer system is presented. The method comprises a first cache receiving a data request from a second cache; the first cache determining or predicting whether the first cache has the lowest cache intervention cost of any cache that can source requested data to the second cache; and the first cache supplying the requested data to the second cache via a cache intervention, if the first cache determines or predicts that the first cache has the lowest cache intervention cost of any cache that can source the requested data to the second cache.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF PREFERRED EMBODIMENTS

Illustrative embodiments of the invention are described below. In the interest of clarity, not all features of an actual implementation are described in this specification. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims. It should be understood that the systems and methods described herein may be implemented in various forms of hardware, software, firmware, or a combination thereof. The methods may be stored on a machine-readable medium, for example, a cache memory, a memory system, or any storage media, having instructions stored thereon for execution by a processor to be performed in a computer system.

Location-aware cache intervention allows cost-conscious cache-to-cache transfers in a cache coherent multiprocessor system. With location-aware cache intervention, when a cache receives a data request of a cache miss, if requested data is found in the cache, the cache can determine (or predict) whether sourcing the data from this cache would result in less intervention cost than sourcing the data from another cache. The decision (or prediction) can be made based on appropriate information maintained in the cache or supplied by cache snoop responses from other caches. At any time, the particular cache that can source data depends on the location of the requesting cache. If the requested data is found in more than one cache, the cache that has (or is predicted to have) the lowest intervention cost is responsible for supplying the data. The intervention cost can be measured by performance metrics that include, but are not limited to, communication latency, bandwidth consumption, load balance, power consumption, and other performance metrics.

Exemplary SMP systems with snoopy cache coherence support will be used to illustrate embodiments in this disclosure. It should be appreciated that the present invention is not limited to snoopy cache coherence schemes. For example, the present invention may employ a directory-based cache coherence scheme, as contemplated by those skilled in the art. Furthermore, it should be appreciated that the present invention is not limited to SMP systems. For example, the present invention may be applied to a non-symmetric multiprocessor system, as contemplated by those skilled in the art.

Figure 2:
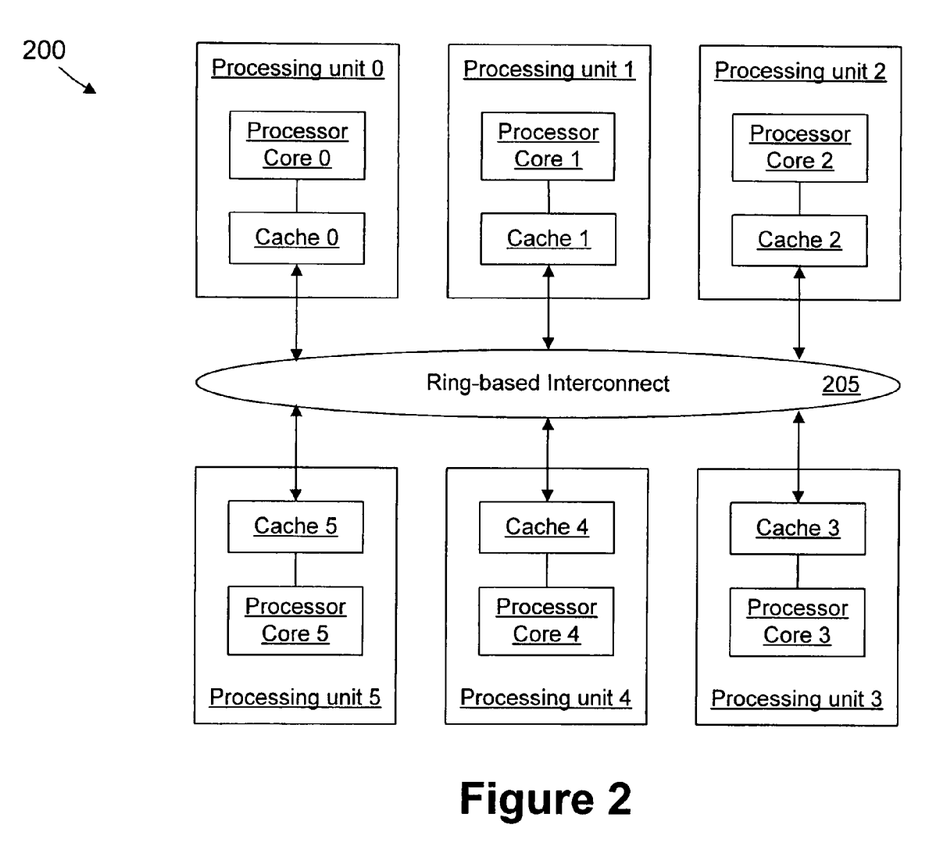
FIG. 2 shows an exemplary SMP system that comprises a number of caches, in accordance with some embodiments of the present invention.

Referring now to FIG. 2, an exemplary SMP system 200 is shown comprising six processing units (labeled "processing unit 0" to "processing unit 5") that are connected via a bi-directional ring-based interconnect 205, in accordance with some embodiments of the present invention. The system 200 also comprises a memory (not shown) shared by the processing units 0-5. Each processing unit 0-5 includes a processor core (labeled "processor core 0" to "processor core 5") and a cache (labeled "cache 0" to "cache 5"). Although the bi-directional ring-based interconnect 205 is used throughout the discussion, it is understood that the present invention can be applied to systems that use any of a variety of different interconnects. Although six processing units 0-5 are depicted, it is understood that any number of processing units may be included in the system 200. Furthermore, although only one cache is shown in each processing unit 0-5, it is understood that each processing unit 0-5 may comprise a cache hierarchy with multiple caches, as contemplated by those skilled in the art.

Throughout the present disclosure, we use the number of communication hops between requesting and supplying caches to measure the cost of a cache intervention. For example, it takes one hop to source data from cache 2 to cache 3, and two hops to source data from cache 5 to cache 3. Without losing generality, we use a simple exemplary tie-breaking method for caches with equal communication hops: a cache with a higher identification number is deemed to have less communication cost. Therefore, although sourcing data from cache 2 to cache 4 takes the same number of hops as sourcing data from cache 0 to cache 4, cache 2 is preferred over cache 0 to supply data to cache 4 because identification number 2 is a higher than identification number 0. It is understood that any of a variety of metrics can be used to measure the cost of a cache intervention, as contemplated by those skilled in the art. It is also understood that a different tie-breaking method may be used, as contemplated by those skilled in the art.

Figure 3:
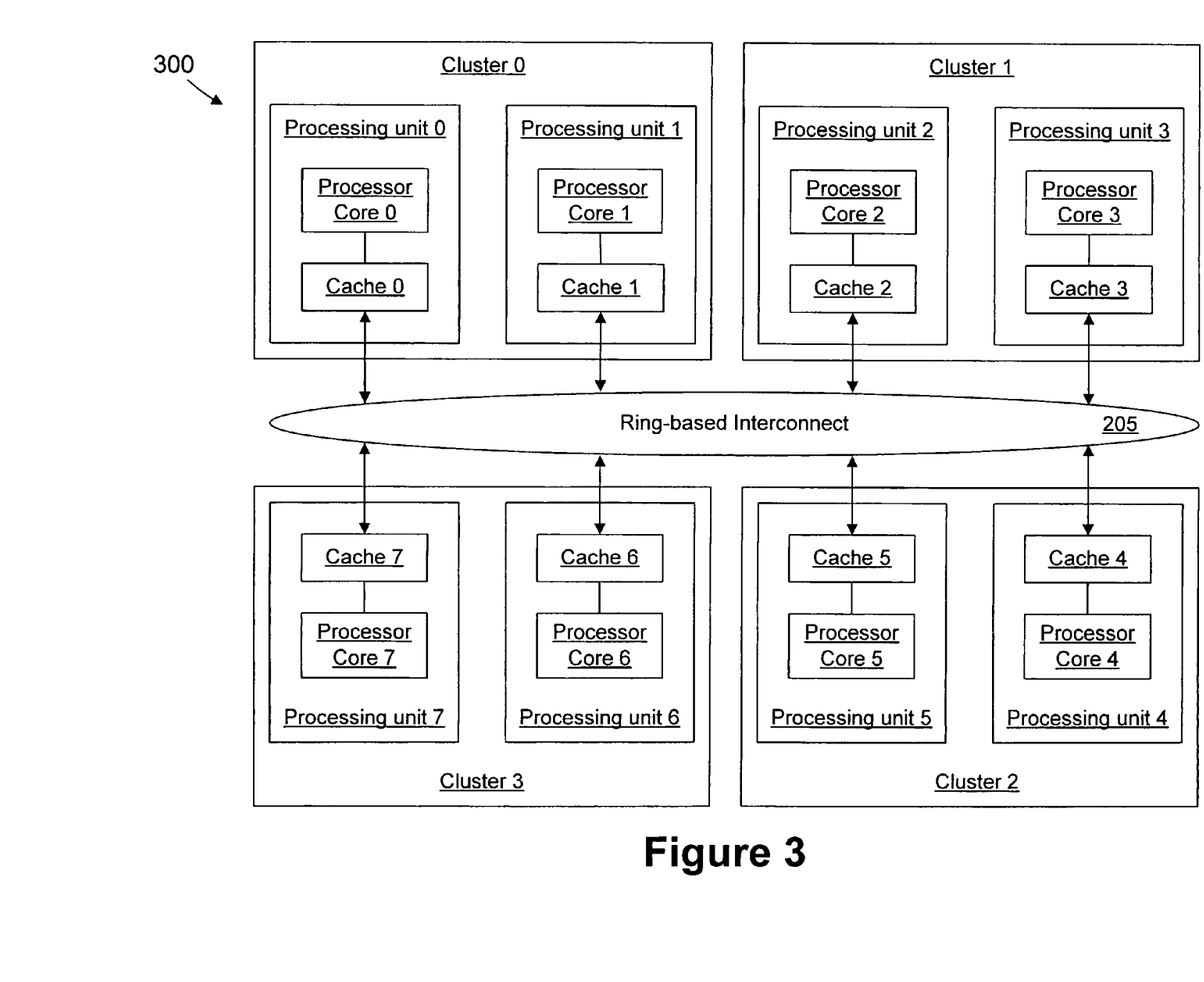
FIG. 3 shows an exemplary SMP system that comprises a number of cache clusters, in accordance with some embodiments of the present invention.

Referring now to FIG. 3, another exemplary SMP system 300 is shown comprising eight processing units (labeled "processing unit 0" to "processing unit 7") that are connected via the bi-directional ring-based interconnect 205. The system 300 also comprises a memory (not shown) shared by the processing units 0-7. Each processing unit 0-7 includes a processor core (labeled "processor core 0" to "processor core 7") and a cache (labeled "cache 0" to "cache 7"). The processing units 0-7 are grouped into four clusters (labeled "cluster 0" to "cluster 3"), wherein each cluster 0-3 includes two processing units 0-7. Although the bi-directional ring-based interconnect 205 is used throughout the discussion, it is understood that the present invention can be applied to systems that use any of a variety of different interconnects. Although the system 300 comprises four clusters 0-3 and each cluster 0-3 comprises two processing units 0-7, it is understood that the system 300 can include any number of clusters and a cluster can include any number of processing units. Furthermore, although only one cache is shown in each processing unit 0-7, it is understood that each processing unit 0-7 may comprise a cache hierarchy with multiple caches, as contemplated by those skilled in the art.

Throughout the present disclosure, we use the number of inter-cluster communication hops to measure the cost of a cache intervention that sources data from a cache 0-7 in a cluster 0-3 to another cache 0-7 in a another cluster 0-3. For example, referring to FIG. 3, it takes one inter-cluster hop to source data from cache 0 to cache 3, and two inter-cluster hops to source data from cache 6 to cache 3. Without losing generality, we use a simple exemplary tie-breaking method for clusters with equal communication hops: a cluster with a higher identification number is deemed to have less communication cost. It is understood that any of a variety of metrics can be used to measure the cost of a cache intervention, as contemplated by those skilled in the art. It is also understood that a different tie-breaking method may be used, as contemplated by those skilled in the art.

In a first illustrative embodiment, each cache maintains an intervention vector for each cache line with shared data. The intervention vector records for which peer caches the cache has intervention responsibility. The intervention vector comprises an intervention bit for each peer cache, indicating whether the cache is responsible for sourcing requested data of the cache line to the peer cache. When a cache receives a data request of a cache miss, it supplies the requested data if the corresponding intervention vector shows that the cache is responsible for cache intervention to the requesting cache.

When a sourcing cache supplies data via a cache intervention, the sourcing cache can offload some of its intervention responsibility to the requesting cache that is to receive the data. Consider a peer cache for which the sourcing cache has the intervention responsibility. If the peer cache is closer to the requesting cache than to the sourcing cache, the intervention responsibility for the peer cache can be transferred to the requesting cache.

Referring to FIG. 2, we now describe an example of location-aware cache-to-cache transfers using intervention vectors. In our notation, each intervention vector maintains its intervention bits in sequential order, wherein the right-most-bit corresponds to cache 0, and the left-most-bit corresponds to cache 5. Assume initially that no cache contains valid data of a given memory address. Consider the following exemplary sequence of cache operations on the address.

(1) Cache 1 issues a data request, and the memory (not shown) supplies the requested data. The intervention vector in cache 1 is set to 111111 because cache 1 is the only cache that has the requested data. The intervention vector indicates that cache 1 has intervention responsibility for all caches.

(2) Cache 0 issues a data request, and cache 1 supplies the data. The intervention vector in cache 0 is set to 110001, indicating that cache 0 has intervention responsibility for caches 0, 4 and 5. On the other hand, the intervention vector in cache 1 is set to 001110, indicating that cache 1 has intervention responsibility for caches 1, 2 and 3.

(3) Cache 3 issues a data request, and cache 1 supplies the data according to its intervention vector. The intervention vector in cache 1 is set to 000010, offloading some intervention responsibility to cache 3. The intervention vector in cache 3 is set to 001100, indicating that cache 3 has intervention responsibility for caches 2 and 3. The intervention vector in cache 0 remains unchanged. The table below summarizes the cache operations and the intervention vector updates, as described above. The label "-" indicates that a cache contains no valid data and therefore maintains no intervention information.

|  | Cache 0 | Cache 1 | Cache 2 | Cache 3 | Cache 4 | Cache 5 |
|---|---|---|---|---|---|---|
| (0) Initially no cache contains the data | — | — | — | — | — | — |
| (1) Cache 1 requests, memory supplies the data | — | 111111 | — | — | — | — |
| (2) Cache 0 requests, cache 1 supplies the data | 110001 | 001110 | — | — | — | — |
| (3) Cache 3 requests, cache 1 supplies the data | 110001 | 000010 | — | 001100 | — | — |

When a cache intervention occurs, intervention responsibility owned by a supplying cache can be split between the supplying cache and the corresponding requesting cache. Sometimes, intervention vectors in other caches also need to be adjusted to ensure minimum intervention cost for future cache requests. In the example above, if later cache 4 issues a data request, cache 0 is responsible for sourcing the data according to its intervention vector, although cache 3 is closer to cache 4. To remedy this problem, when a cache intervention occurs, the receiving cache can take appropriate intervention responsibility from not only the supplying cache, but also other caches as is necessary. In this case, when cache 0 observes that cache 3 receives the data, cache 0 can offload intervention responsibility of cache 4 to cache 3, because cache 4 is closer to cache 3 than to cache 0. As a result, the intervention vectors in caches 0 and 3 become 100001 and 011100, respectively. The table below illustrates the intervention vector updates.

|  | Cache 0 | Cache 1 | Cache 2 | Cache 3 | Cache 4 | Cache 5 |
|---|---|---|---|---|---|---|
| (0) Initially no cache contains the data | — | — | — | — | — | — |
| (1) Cache 1 requests, memory supplies the data | — | 111111 | — | — | — | — |
| (2) Cache 0 requests, cache 1 supplies the data | 110001 | 001110 | — | — | — | — |
| (3) Cache 3 requests, cache 1 supplies the data | 100001 | 000010 | — | 001100 | — | — |

When a cache issues a data request of a cache miss, it is possible that no cache supplies the requested data, although the data can be found in one or more caches. This can happen in at least two situations. In a first situation, a cache replaces data of a cache line without transferring its intervention responsibility to other caches. In a second situation, a cache transfers some of its intervention responsibility to another cache, but the cache that is to receive the intervention responsibility receives a data request before the corresponding intervention responsibility arrives. In the previous example, if cache 3 receives a data request from cache 4 before the offloaded intervention responsibility from cache 0, cache 3 will not supply the requested data. Meanwhile, cache 0 also will not supply the data because it has transferred the intervention responsibility to cache 3.

When a data request cannot be serviced by any cache, the memory can supply the requested data. A combined snoop response can include a combined intervention vector, wherein an intervention bit in the combined intervention vector is set to 1 if the corresponding intervention bit is set to 1 in any snooped cache. When a cache receives the requested data from the memory, the cache can assume intervention responsibility for each cache whose corresponding intervention bit is 0 in the combined intervention vector.

Referring again to FIG. 2, we now describe an example of intervention vector updates in case of cache line replacements. Assume initially that no cache contains valid data of a given memory address. Consider the following exemplary sequence of cache operations on the address.

(1) Cache 1 issues a data request, and the memory (not shown) supplies the requested data. The intervention vector in cache 1 is set to 111111.

(2) Cache 0 issues a data request, and cache 1 supplies the requested data. The intervention vectors in caches 0 and 1 are set to 110001 and 001110, respectively.

(3) Cache 1 replaces the data without informing other caches. As a result, no cache is responsible for cache intervention to caches 1, 2 and 3.

(4) Cache 3 issues a data request, and the memory supplies the data. The intervention vector in cache 3 is set to 001110 according to the combined snoop response. The table below summarizes the cache operations and the intervention vector updates, as described above.

|  | Cache 0 | Cache 1 | Cache 2 | Cache 3 | Cache 4 | Cache 5 |
|---|---|---|---|---|---|---|
| (0) Initially no cache contains the data | — | — | — | — | — | — |

-continued

|  | Cache 0 | Cache 1 | Cache 2 | Cache 3 | Cache 4 | Cache 5 |
|---|---|---|---|---|---|---|
| (1) Cache 1 requests, memory supplies the data | — | 111111 | — | — | — | — |
| (2) Cache 0 requests, Cache 1 supplies the data | 110001 | 001110 | — | — | — | — |
| (3) Cache 1 replaces the data | 110001 | — | — | — | — | — |
| (4) Cache 3 requests, memory supplies the data | 110001 | — | — | 001110 | — | — |

In the previous example, when the data is shared in caches 0 and 3, it is desirable to set the intervention vectors in caches 0 and 3 to be 100011 and 011100, respectively. This can be achieved by redistributing intervention responsibility at the appropriate time. It is worth noting that the redistribution of intervention responsibility can be determined by the combined snoop response that shows all caches from which the data can be sourced.

For a shared cache line, if an intervention bit is set in an intervention vector in a cache, the corresponding intervention bit cannot be set in another intervention vector in another cache. This is simply because no cache can obtain intervention responsibility that is owned by another cache. Therefore, even with imprecise intervention information, there can be at most one cache supplying data for a data request.

Reducing the storage overhead resulting from intervention vectors is generally important in the implementation of location-aware cache-to-cache transfers. It is obvious that an intervention vector maintained in a cache does not need to include an intervention bit for the cache itself. Furthermore, intervention information represented by an intervention vector can often be encoded more compactly, because certain intervention bit permutations cannot happen due to various constraints. Referring to FIG. 2, for example, if cache 0 has intervention responsibility for cache 2, it should also have intervention responsibility for cache 1. Similarly, if cache 0 has intervention responsibility for cache 3, it should have intervention responsibility for all its peer caches. It can be shown that cache 0 allows the following intervention bit permutations (intervention bits corresponding to caches 1 to 5 are shown).

00000: Cache 0 has no intervention responsibility for any peer cache.
00001: Cache 0 has intervention responsibility for cache 1.
00011: Cache 0 has intervention responsibility for caches 1 and 2.
10000: Cache 0 has intervention responsibility for cache 5.
11000: Cache 0 has intervention responsibility for caches 4 and 5.
11111: Cache 0 has intervention responsibility for all its peer caches.

It is worth noting that intervention information can be encoded with a cache state to further reduce the storage overhead. Since intervention information is maintained only for a shared cache line, we can incorporate intervention information by employing a number of distinct shared states in the cache coherence protocol, wherein each shared state represents some particular intervention responsibility. Referring again to FIG. 2, for example, cache 0 can have distinct shared states as follows, wherein each shared state specifies the corresponding intervention responsibility.

Shared: Cache 0 has shared data that cannot be sourced to any peer cache.
Shared-IR-1: Cache 0 has shared data that can be sourced to cache 1.
Shared-IR-1-2: Cache 0 has shared data that can be sourced to caches 1 and 2.
Shared-IR-5: Cache 0 has shared data that can be sourced to cache 5.
Shared-IR-4-5: Cache 0 has shared data that can be sourced to caches 4 and 5.
Shared-IR-All: Cache 0 has shared data that can be sourced to all its peer caches. This is generally equivalent to the exclusive state.

In a second illustrative embodiment, caches are grouped into clusters according to proximity. Each cache line with shared data maintains an intervention vector that records cache clusters to which the cache is responsible for supplying the data. The intervention vector comprises an intervention bit for each cache cluster, indicating whether the cache is responsible for sourcing data to that cluster. Maintaining intervention information for cache clusters instead of individual caches can reduce storage space used by intervention vectors.

When shared data is cached in a cluster, a cache in the cluster can be selected as the inter-cluster sourcing cache that can source data to a cache in another cluster. For a shared cache line, an intervention vector needs to be maintained only in an inter-cluster sourcing cache. In addition, a cache in the cluster can be selected as the intra-cluster sourcing cache that can source data to another cache in the same cluster. For example, the cache that receives the last shared copy in the cluster can be selected as the intra-cluster sourcing cache. If a cluster includes an inter-cluster sourcing cache and an intra-cluster sourcing cache, the inter-cluster sourcing cache and the intra-cluster sourcing cache may be the same cache.

When an inter-cluster sourcing cache receives a data request from a requesting cache in another cluster, the inter-cluster sourcing cache supplies requested data to the requesting cache via a cache intervention, if the intervention vector shows that the inter-cluster sourcing cache has intervention responsibility for the requesting cluster. When a cache supplies data to another cache via an inter-cluster cache intervention, it can offload some of its intervention responsibility to the cache that is to receive the data.

Referring to FIG. 3, we now describe an example of maintaining intervention vectors for cache clusters. In our notation, each intervention vector maintains its intervention bits in sequential order, wherein the right-most-bit corresponds to cache cluster 0, and the left-most-bit corresponds to cache cluster 3. Assume initially that no cache contains valid data of a given memory address. Consider the following exemplary sequence of cache operations on the address.

(1) Cache 1 issues a data request, and the memory (not shown) supplies the data. The intervention vector in cache 1 is set to 1111, indicating that cache 1 has intervention responsibility for all clusters.

(2) Cache 0 issues a data request, and cache 1 supplies the data. Cache 0 receives intervention information from cache 1, and becomes the sourcing cache in cluster 0.

(3) Cache 2 issues a data request, and cache 0 supplies the data. The intervention vector in cache 0 is set to 1001, offloading some of its intervention responsibility to cache 2. The intervention vector in cache 2 is set to 0110, indicating that cache 2 has intervention responsibility for clusters 1 and 2.

(4) Cache 5 issues a data request, and cache 2 supplies the data according to its intervention vector. The intervention vectors in caches 2 and 5 are set to 0010 and 0100, respectively. The table below summarizes the cache operations and the intervention vector updates, as described above. The label "S" indicates that a cache contains shared data that cannot be sourced to another cache, and the label "-" indicates that a cache contains no valid data and therefore maintains no intervention information.

|  | Cluster 0 | | Cluster 1 | | Cluster 2 | | Cluster 3 | |
| --- | --- | --- | --- | --- | --- | --- | --- | --- |
|  | Cache 0 | Cache 1 | Cache 2 | Cache 3 | Cache 4 | Cache 5 | Cache 6 | Cache 7 |
| (0) Initially no cache contains the data | — | — | — | — | — | — | — | — |
| (1) Cache 1 receives the data from memory | — | 1111 | — | — | — | — | — | — |
| (2) Cache 0 receives the data from cache 1 | 1111 | S | — | — | — | — | — | — |
| (3) Cache 2 receives the data from cache 0 | 1001 | S | 0110 | — | — | — | — | — |
| (4) Cache 5 receives the data from cache 2 | 1001 | S | 0010 | — | — | 0100 | — | — |

It is obvious that an intervention vector maintained in a cache cluster does not need to include an intervention bit for the cache cluster itself. Furthermore, intervention information represented by an intervention vector can often be encoded more compactly, because certain intervention bit permutations cannot happen due to various constraints. Referring to FIG. 3, for example, if a cache in cache cluster 0 has intervention responsibility for cache cluster 2, it should also have intervention responsibility for cache clusters 1 and 3. It can be shown that a cache in cache cluster 0 allows the following intervention bit permutations (intervention bits corresponding to cache clusters 1 to 3 are shown).

000: The cache has no intervention responsibility for any peer cluster.
001: The cache has intervention responsibility for cluster 1.
100: The cache has intervention responsibility for cluster 3.
111: The cache has intervention responsibility for clusters 1, 2 and 3.

It is worth noting that intervention information can be encoded with a cache state to further reduce the storage overhead. Since intervention information is maintained only for a shared cache line, we can incorporate intervention information by employing a number of distinct shared states in the cache coherence protocol, wherein each shared state represents some particular intervention responsibility. Referring again to FIG. 3, for example, a cache in cache cluster 0 can have distinct shared states as follows, wherein each shared state specifies the corresponding intervention responsibility.

Shared: The cache has shared data that cannot be sourced to another cache.
Shared-IR-0: The cache has shared data that can be sourced to another cache in cluster 0. This usually indicates that the cache is an intra-cluster sourcing cache but not an inter-cluster sourcing cache.
Shared-IR-0-1: The cache has shared data that can be sourced to another cache in clusters 0 and 1.
Shared-IR-0-3: The cache has shared data that can be sourced to another cache in clusters 0 and 3.
Shared-IR-All: The cache has shared data that can be sourced to another cache in any cluster. This usually indicates that the data is only cached in cluster 0.

In a third illustrative embodiment, each cache maintains a location vector for each cache line with shared data. The location vector records the caches in which the data is valid. The location vector comprises a location bit for each peer cache, wherein the location bit indicates whether the data is being cached in that cache.

When a cache receives a data request of a cache miss, the cache supplies the requested data via a cache intervention, if the data is found in the cache, and the corresponding location vector indicates that the cache has a lower cache intervention cost compared with other caches in which the data can also be found. In addition to the requested data, the supplying cache can also provide its location vector information to the requesting cache. When the requesting cache receives the data, the requesting cache can set its location vector according to the location information from the supplying cache.

A location-aware cache coherence protocol can choose to maintain precise location information. As a result, when a cache miss occurs, if requested data is resident in one or more caches, exactly one cache will supply the data via a cache intervention. Alternatively, a location-aware cache coherence protocol can choose to maintain location information as heuristic information that may not necessarily be up-to-date. Consequently, when a cache miss occurs, if requested data is resident in one or more caches, it is possible that more than one cache supplies the data, or no cache supplies the data. In the latter case, a proper mechanism is needed to ensure that the cache miss is eventually serviced.

Referring to FIG. 2, we show an example of location-aware cache-to-cache transfers based on precise location information. In our notation, each location vector maintains its location bits in sequential order, wherein the right-most-bit corresponds to cache 0, and the left-most-bit corresponds to cache 5. Assume initially that no cache contains valid data of a given memory address. Consider the following exemplary sequence of cache operations on the address.

(1) Cache 1 issues a data request, and the memory (not shown) supplies the data. The location vector in cache 1 is set to 000010, indicating that the data is valid only in cache 1.

(2) Cache 0 issues a data request, and cache 1 supplies the data. The location vectors in caches 0 and 1 are set to 000011, indicating that the data is valid in caches 0 and 1.

(3) Cache 2 issues a data request, and cache 1 supplies the data according to the location information. The location vectors in caches 0, 1 and 2 are set to 000111, indicating that the data is valid in caches 0, 1 and 2.

(4) Cache 3 issues a data request, and cache 2 supplies the data according to its location information. The location vectors in caches 0, 1, 2 and 3 are set to 001111, indicating that the data is valid in caches 0, 1, 2 and 3.

(5) Cache 3 replaces the data from the cache, and informs other caches of the cache line replacement. As a result, the location vectors in caches 0, 1 and 2 are updated to 000111 accordingly.

(6) Cache 4 issues a data request, and cache 2 supplies the data according to its location information. The location vectors in caches 0, 1, 2 and 4 are set to 010111, indicating that the data is valid in caches 0, 1, 2 and 4. The table below summarizes the cache operations and the location vector updates, as described above. The label "-" indicates that a cache contains no valid data and therefore maintains no location information.

|  | Cache 0 | Cache 1 | Cache 2 | Cache 3 | Cache 4 | Cache 5 |
| --- | --- | --- | --- | --- | --- | --- |
| (0) Initially no cache contains the data | — | — | — | — | — | — |
| (1) Cache 1 requests, memory supplies the data | — | 000010 | — | — | — | — |
| (2) Cache 0 requests, cache 1 supplies the data | 000011 | 000011 | — | — | — | — |
| (3) Cache 2 requests, cache 1 supplies the data | 000111 | 000111 | 000111 | — | — | — |
| (4) Cache 3 requests, cache 2 supplies the data | 001111 | 001111 | 001111 | 001111 | — | — |
| (5) Cache 3 replaces the data | 000111 | 000111 | 000111 | — | — | — |
| (6) Cache 4 requests, cache 2 supplies the data | 010111 | 010111 | 010111 | — | 010111 | — |

Maintaining up-to-date location vector information can be difficult and expensive. This is because a cache operation in one cache may not necessarily be observable to another cache. For example, a cache may prefer not to inform other caches in case of replacement of a cache line. This implies that other caches may not be able to update their location vectors accordingly due to the lack of information. Another reason of imprecise location information is the latency of location vector updates. For example, when a cache issues a data request and receives the requested data, it may take some time before other caches are notified.

Imprecise location information can be used as heuristic information to improve system performance. With imprecise location vector information, a data request can result in multiple cache interventions or no cache intervention (though the data is valid in one or more caches). If more than one cache supplies the data, the requesting cache can use the data that arrives first and discard other redundant copies. If no cache supplies the data, the memory can source the data to the requesting cache. An alternative is to reissue the data request if the combined snoop response shows that the data is valid in one or more caches. A particular cache (e.g., the cache with the last received shared copy) can be pre-assigned as the default sourcing cache which is responsible for servicing the reissued data request.

Referring again to FIG. 2, we show an exemplary scenario in which multiple cache interventions are invoked by a cache request due to imprecise location information. Assume initially that no cache contains valid data of a given memory address. Consider the following exemplary sequence of cache operations on the memory address.

(1) Cache 1 issues a data request, and the memory (not shown) supplies the data. The location vector in cache 1 is set to 000010.

(2) Cache 0 issues a data request, and cache 1 supplies the data. The location vectors in caches 0 and 1 are set to 000011.

(3) Cache 3 issues a data request, and cache 1 supplies the data. The location vectors in caches 1 and 3 are set to 001011, indicating that the data is valid in caches 0, 1 and 3. However, the location vector in cache 0 is not immediately updated.

(4) Cache 4 issues a data request, which arrives at cache 0 before the pending location update completes. In this case, both cache 0 and cache 3 will supply the data to cache 4. This is because the imprecise location vector in cache 0 incorrectly shows that cache 0 is the closest cache with the requested data. The table below summarizes the cache operations and the location vector updates, as described above.

|  | Cache 0 | Cache 1 | Cache 2 | Cache 3 | Cache 4 | Cache 5 |
| --- | --- | --- | --- | --- | --- | --- |
| (0) Initially no cache contains the data | — | — | — | — | — | — |
| (1) Cache 1 requests, memory supplies the data | — | 000010 | — | — | — | — |
| (2) Cache 0 requests, cache 1 supplies the data | 000011 | 000011 | — | — | — | — |
| (3) Cache 3 requests, cache 1 supplies the data | 000011 | 001011 | — | 001011 | — | — |
| (4) Cache 4 requests, cache 0/3 supply the data | 011011 | 011011 | — | 011011 | 011011 | — |

Referring again to FIG. 2, we show an exemplary scenario in which no cache intervention is invoked by a cache request due to imprecise location information. Assume initially that no cache contains valid data of a given memory address. Consider the following exemplary sequence of cache operations on the address.

(1) Cache 1 issues a data request, and the memory (not shown) supplies the data. The location vector in cache 1 is set to 000010.

(2) Cache 0 issues a data request, and cache 1 supplies the data. The location vectors in caches 0 and 1 are set to 000011.

(3) Cache 3 issues a data request, and cache 1 supplies the data. The location vectors in caches 0, 1 and 3 are set to 001011, indicating that the data is valid in caches 0, 1 and 3.

(4) Cache 3 replaces its data without notifying other caches.

(5) Cache 4 issues a data request, and no cache will supply the data. This is because the imprecise location vectors in caches 0 and 1 incorrectly show that cache 3 is to supply the requested data. In this case, the memory will supply the data to cache 4. The table below summarizes the cache operations and the location vector updates, as described above.

|  | Cache 0 | Cache 1 | Cache 2 | Cache 3 | Cache 4 | Cache 5 |
|---|---|---|---|---|---|---|
| (0) Initially no cache contains the data | — | — | — | — | — | — |
| (1) Cache 1 requests, memory supplies the data | — | 000010 | — | — | — | — |
| (2) Cache 0 requests, cache 1 supplies the data | 000011 | 000011 | — | — | — | — |
| (3) Cache 3 requests, cache 1 supplies the data | 001011 | 001011 | — | 001011 | — | — |
| (4) Cache 3 replaces the data | 001011 | 001011 | — | — | — | — |
| (5) Cache 4 requests, memory supplies the data the data | 010011 | 010011 | — | — | 010011 | — |

Snoop responses can be used to detect and repair imprecise location information. In the previous example, when cache 4 issues a data request, a snoop response from cache 3 indicates that the requested data is not cached in cache 3. When cache 0 observes the snoop response from cache 3, cache 0 will realize that its location information regarding cache 3 is incorrect and therefore can update its location information accordingly.

In practice, it is unnecessary for a location vector to include a location bit for the cache in which the location vector is maintained. Instead, each shared cache line can maintain an N-1 bit location vector, where N is number of caches in the system. It is worth noting that a location vector of a cache line may be encoded with the corresponding cache state to further reduce implementation overhead.

In a fourth illustrative embodiment, caches are grouped into clusters according to proximity. Each cache line with shared data maintains a location vector that records which cache clusters have the shared data. The location vector comprises a location bit for each cache cluster, indicating whether the data is cached in that cache cluster. Maintaining location information for cache clusters instead of individual caches can reduce storage space used by location vectors. When a cache receives a data request from a different cluster, the cache supplies the requested data via a cache intervention, if the data is found in the cache, and the corresponding location vector indicates that the cache has a lower cache intervention cost compared with caches in other clusters in which the data can also be found.

Referring to FIG. 3, we now describe an example of maintaining location vectors for cache clusters. In our notation, each location vector maintains its location bits in sequential order, wherein the right-most-bit corresponds to cache cluster 0, and the left-most-bit corresponds to cache cluster 3. Assume initially that no cache contains valid data of a given memory address. Consider the following exemplary sequence of cache operations on the address.

(1) Cache 1 issues a data request, and the memory (not shown) supplies the data. The location vector in cache 1 is set to 0001, indicating that the data is valid only in cluster 0.

(2) Cache 0 issues a data request, and cache 1 supplies the data. Cache 0 receives location information from cache 1, and becomes the sourcing cache in cluster 0.

(3) Cache 2 issues a data request, and cache 0 supplies the data. The location vectors in caches 0 and 2 are set to 0011, indicating that the data is valid in clusters 0 and 1.

(4) Cache 5 issues a data request, and cache 2 supplies the data according to its location vector. The location vectors in caches 0, 2 and 5 are set to 0111, indicating that the data is valid in clusters 0, 1 and 2. The table below summarizes the cache operations and the location vector updates, as described above. The label "S" indicates that a cache contains shared data that cannot be sourced to another cache, and the label "-" indicates that a cache contains no valid data and therefore maintains no location information.

|  | Cluster 0 | | Cluster 1 | | Cluster 2 | | Cluster 3 | |
|---|---|---|---|---|---|---|---|---|
|  | Cache 0 | Cache 1 | Cache 2 | Cache 3 | Cache 4 | Cache 5 | Cache 6 | Cache 7 |
| (0) Initially no cache contains the data | — | — | — | — | — | — | — | — |
| (1) Cache 1 receives the data from memory | — | 0001 | — | — | — | — | — | — |
| (2) Cache 0 receives the data from cache 1 | 0001 | S | — | — | — | — | — | — |

-continued

| | Cluster 0 | | Cluster 1 | | Cluster 2 | | Cluster 3 | |
|---|---|---|---|---|---|---|---|---|
| | Cache 0 | Cache 1 | Cache 2 | Cache 3 | Cache 4 | Cache 5 | Cache 6 | Cache 7 |
| (3) Cache 2 receives the data from cache 0 | 0011 | S | 0011 | — | — | — | — | — |
| (4) Cache 5 receives the data from cache 2 | 0111 | S | 0111 | — | — | 0111 | — | — |

In practice, it is unnecessary for a location vector to maintain a location bit for the cache cluster in which the location vector is maintained. Instead, each shared cache line can maintain an N-1 bit location vector, where N is the number of cache clusters in the system. It is worth noting that a location vector of a cache line may be encoded with the corresponding cache state to further reduce storage overhead.

In a fifth illustrative embodiment, each cache can use snoop responses from its peer caches to determine or predict whether the cache has the lowest cache intervention cost of any cache from which requested data can be supplied. When a cache receives a data request from a requesting cache, the cache sources the requested data to the requesting cache via a cache intervention, if the cache contains the requested data, and snoop responses from other caches indicate that the requested data cannot be supplied from another cache with lower intervention cost.

When a cache is snooped due to a data request, the cache generates a snoop response indicating whether requested data is found and the state of the corresponding cache line. This information can be made available to other caches via various approaches. In a first exemplary approach, a snoop response from each cache can be directly sent to all other caches. In a second exemplary approach, a snoop response from each cache can be sent to a snoop response combining component, which generates a combined snoop response indicating caches from which requested data can be supplied. The combined snoop response can then be sent to all caches in the system. In a third exemplary approach, a combined snoop response can be generated based on a partially combined snoop response ("PCSR") accumulated step-by-step using a unidirectional ring. When a cache miss occurs, the requesting cache sends an initial PCSR with a null value to the subsequent cache in the ring. When a cache receives a PCSR, the cache combines the PCSR with its own snoop response to generate a new PCSR, which is then sent to the subsequent cache in the ring. When a fully combined snoop response is finally generated, it can be sent to all caches in the system.

It is worth pointing out that, compared with the previous embodiments described above, location-aware cache intervention based on snoop responses can eliminate the storage overhead resulting from intervention or location vectors. Although location-aware cache intervention based on snoop responses can reduce bandwidth consumption of cache-to-cache transfers, it may increase latency to service a cache request since requested data cannot be sourced from a cache until corresponding snoop responses from other caches become available.

To reduce latency of servicing a cache request, location-aware cache intervention decision or prediction can be made according to snoop responses from some peer caches instead of all peer caches. Given a requesting cache and a potential sourcing cache, some particular peer caches can be chosen as snoop response required caches, indicating that the potential sourcing cache needs their snoop responses to decide or predict whether the potential sourcing cache should supply data to the requesting cache. The snoop response required caches generally include those peer caches that can source data to the requesting cache with a lower cache intervention cost than the potential sourcing cache. When the potential sourcing cache receives a data request from the requesting cache, the potential sourcing cache supplies the requested data to the requesting cache, if the corresponding snoop responses indicate that the requested data is not found in the snoop response required caches.

Figure 4:
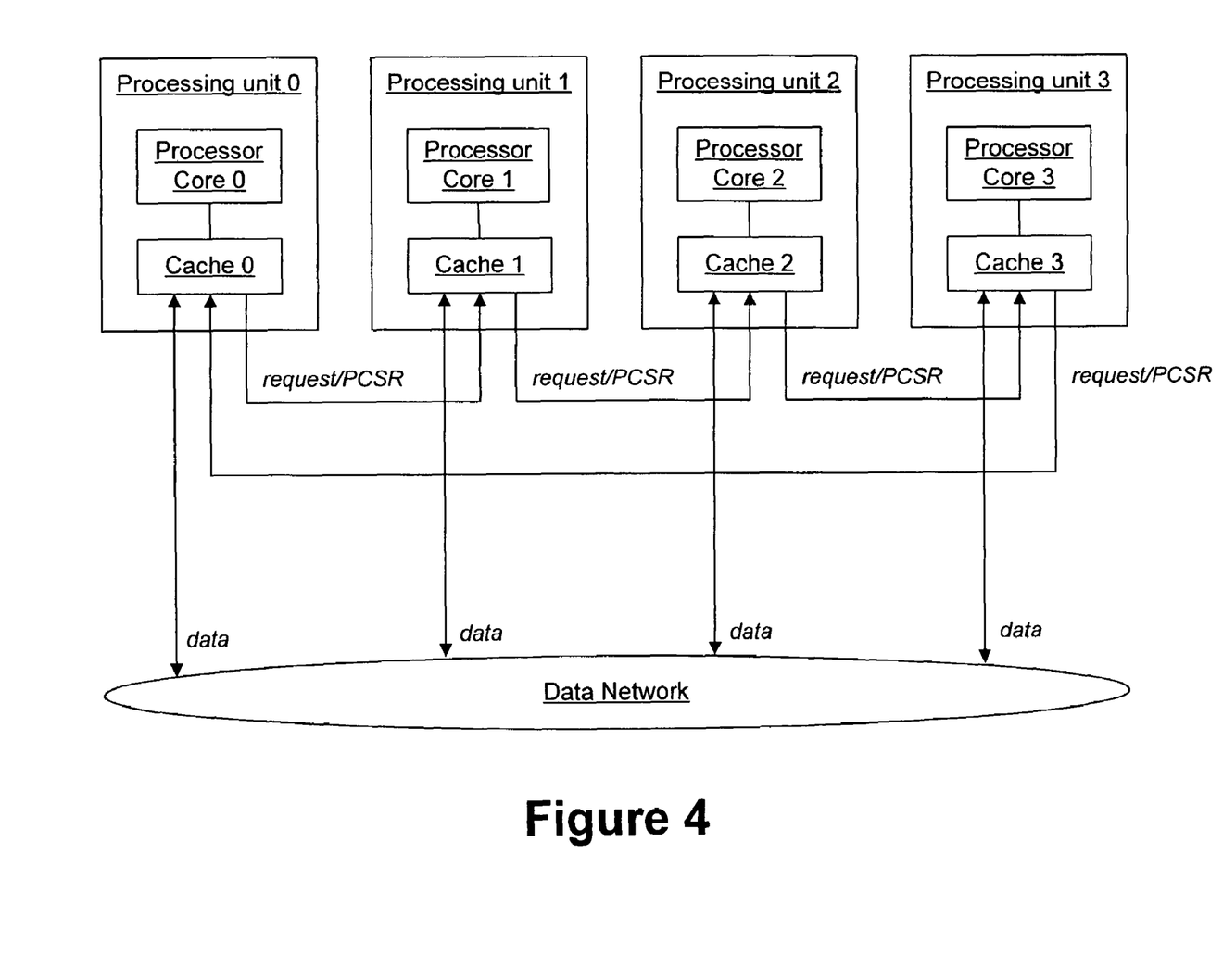
FIG. 4 shows an exemplary SMP system that uses a unidirectional ring to generate partially combined snoop response, and uses a data network to transfer data between caches and memory, in accordance with one embodiment of the present invention.

Referring to FIG. 4, we show an exemplary SMP system, wherein a unidirectional ring is employed to deliver a cache request and its associated snoop responses, and a data network is employed to transfer data between caches and memory. Given a requesting cache, snoop response required caches for a potential sourcing cache include the caches between the requesting cache and the potential sourcing caches along the unidirectional ring. When a cache miss occurs, the requesting cache sends a cache request and an initial partially combined snoop response ("PCSR") with a null value to the subsequent cache in the ring. When a cache receives the cache request and its associated PCSR, it initiates a cache intervention to supply the requested data to the requesting cache, if the data is found in the cache and the PCSR indicates that the data has not been supplied by any previous cache. If the data is not found in the cache, the cache combines the PCSR with its own snoop response to generate a new PCSR, which is then sent to the subsequent cache in the ring.

In the example above, requested data of a cache miss may be supplied with lowest cache intervention cost, depending on characteristics of the data network. If the data network is a unidirectional ring in the opposite direction with respect to the unidirectional ring for cache requests and snoop responses, it can be shown that a cache intervention is initiated from a cache that is closest to the requesting cache. This is because when a cache receives a data request and its associated PCSR, the received PCSR includes snoop responses from all caches that can supply data to the requesting cache with a less number of message-passing hops in the data network.

With location-aware cache interventions based on (full or partial) snoop responses, it is worth noting that, for a given cache request, without snoop responses from other caches, a particular cache can determine according to its own cache state whether it should supply the data to the requesting cache, provided that the cache has the lowest cache intervention cost of any cache with respect to the requesting cache. This observation motivates a simple optimization based on preferred intervening caches that can be used in SMP systems to improve cache intervention performance.

In an SMP system, each cache can be assigned a preferred intervening cache, which is generally a peer cache that can supply data with the lowest cache intervention cost. As the name suggests, a preferred intervening cache is preferred to supply requested data if possible. The preferred intervening cache for a requesting cache is usually a neighboring cache in the data network used for cache-to-cache transfers. When a cache miss occurs, the requesting cache sends a data request to its peer caches including the preferred intervening cache. When the preferred intervening cache receives the data request, the preferred intervening cache can supply the requested data immediately if the data is found in the cache. In contrast, when a cache other than the preferred intervening cache receives the data request, the cache cannot supply the requested data before the cache is notified that the data is not found in the preferred intervening cache.

It can be shown that the optimization based on preferred intervening caches can also be incorporated into conventional cache coherence schemes. For example, consider a cache coherence protocol that allows a fixed cache to supply requested data of a shared cache line at any given time, regardless of the location of the requesting cache. If data of a memory address is shared in more than one cache, a particular cache with the shared data is selected as the owner cache which is responsible for sourcing the data to another cache if necessary. With the preferred intervening cache optimization, when the owner cache receives a cache request from a requesting cache, the owner cache supplies the data only if the snoop response from the corresponding preferred intervening cache shows that the data cannot be supplied from the preferred intervening cache.

The idea of using preferred intervening caches can be generalized to allow multiple preferred intervening caches with different priorities. Each cache can have a first preferred intervening cache, a second preferred intervening cache, and so on. Given a requesting cache, different preferred intervening caches with different priorities generally correspond to different cache intervention costs. For example, when the second preferred intervening cache receives a data request, the second preferred intervening cache initiates a cache intervention only if the data is found in the second preferred intervening cache but not in the first preferred intervening cache.

The particular embodiments disclosed above are illustrative only, as the invention may be modified and practiced in different but equivalent manners apparent to those skilled in the art having the benefit of the teachings herein. Furthermore, no limitations are intended to the details of design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A system of location-aware cache intervention in a computer system, comprising:
    a plurality of caches, comprising a first cache and at least one other cache;
    wherein the first cache maintains intervention information for at least one memory address, the intervention information indicating for which of the at least one other cache the first cache has intervention responsibility, and
    wherein respective parts of the intervention information correspond to a respective one of the at least one other cache and each part indicates whether the first cache is responsible for sourcing data of the memory address to the corresponding cache via a cache intervention.

2. The system of claim 1, wherein if the intervention information of a memory address in the at least one memory address indicates that the first cache has intervention responsibility for a second cache in the at least one other cache, the first cache is responsible for a cache intervention to source requested data of the memory address to the second cache, the data being one of requested and predicted to be requested by the second cache.

3. The system of claim 2, wherein the cache intervention incurs a cache intervention cost, the cache intervention cost being one of measured, computed and predicted using at least one performance metric.

4. The system of claim 3, wherein the at least one performance metric is based on at least one of bandwidth consumption, communication latency, number of message-passing hops, load balance, and power consumption.

5. The system of claim 3, wherein the first cache performs an intervention responsibility offload operation, the intervention responsibility offload operation offloading the intervention responsibility of the memory address for the second cache to a third cache in the at least one other cache.

6. The system of claim 5, wherein the first cache performs the intervention responsibility offload operation, if
    (a) the intervention information indicates that the first cache has the intervention responsibility of the memory address for the second cache,
    (b) the cache intervention cost of sourcing the data of the memory address from the third cache to the second cache is lower than the cache intervention cost of sourcing the data of the memory address from the first cache to the second cache, and
    (c) the first cache sources the data of the memory address to the third cache.

7. The system of claim 5, wherein the first cache performs the intervention responsibility offload operation, if
    (a) the intervention information indicates that the first cache has the intervention responsibility of the memory address for the second cache, and
    (b) the cache intervention cost of sourcing the data of the memory address from the third cache to the second cache is lower than the cache intervention cost of sourcing the data of the memory address from the first cache to the second cache.

8. The system of claim 3, wherein the first cache performs an intervention responsibility release operation, the intervention responsibility release operation releasing the intervention responsibility of the memory address for the second cache.

9. The system of claim 8, wherein the first cache performs the intervention responsibility release operation, if
    (a) the intervention information indicates that the first cache has the intervention responsibility of the memory address for the second cache, and
    (b) the corresponding cache line of the memory address is one of replaced and invalidated from the first cache.

10. The system of claim 3, wherein the first cache performs an intervention responsibility acquire operation, the intervention responsibility acquire operation acquiring the intervention responsibility of the memory address for the second cache.

11. The system of claim 10, wherein the first cache performs the intervention responsibility acquire operation, if
    (a) no cache in the plurality of caches exists that has the intervention responsibility of the memory address for the second cache, and (b) the first cache has the lowest cache intervention cost of any cache in the plurality of caches that can source the data of the memory address to the second cache.

12. The system of claim 10, wherein the first cache performs the intervention responsibility acquire operation, if no cache in the plurality of caches exists that has the intervention responsibility of the memory address for the second cache.

13. The system of claim 1, wherein an owner cache in the plurality of caches supplies data of a memory address in the at least one memory address to a second cache in the plurality of caches, if
(a) the data of the memory address is one of requested and predicted to be requested by the second cache, and
(b) no cache in the plurality of caches exists that has the intervention responsibility of the memory address for the second cache.

14. The system of claim 1, further comprising a memory operatively associated to the plurality of caches, wherein the memory supplies data of a memory address in the at least one memory address to a second cache in the plurality of caches, if
(a) the data of the memory address is one of requested and predicted to be requested by the second cache, and
(b) no cache in the plurality of caches exists that has the intervention responsibility of the memory address for the second cache.

15. The system of claim 1, wherein the intervention information is maintained as an intervention vector for each cache line with shared data, the intervention vector comprises at least one intervention bit, and each of the at least one intervention bit corresponds to each of the at least one other cache; and wherein the each of the at least one intervention bit indicates whether the first cache is responsible for sourcing data of the cache line to the corresponding each of the at least one other cache via a cache intervention.

16. The system of claim 15, wherein the intervention information is compressed and encoded to reduce the storage overhead.

17. The system of claim 16, wherein the intervention information of a cache line is encoded with the state of the cache line.

18. A system of location-aware cache intervention in a computer system, comprising:
a plurality of cache clusters, comprising a first cache cluster and at least one other cache cluster;
wherein each of the plurality of cache clusters comprises at least one cache, the first cache cluster comprises a first cache;
wherein the first cache maintains intervention information for at least one memory address, the intervention information indicating for which of the at least one other cache cluster the first cache has intervention responsibility, and
wherein the intervention information is maintained for each cache line with shared data and a respective part of the intervention information corresponds to a respective one of the at least one other cache cluster and indicates whether the first cache cluster is responsible for sourcing data of the cache line to the corresponding cache cluster via a cache intervention.

19. The system of claim 18, wherein if the intervention information of a memory address in the at least one memory address indicates that the first cache has intervention responsibility for a second cache cluster in the at least one other cache cluster, the first cache is responsible for a cache intervention to source data of the memory address to a second cache in the second cache cluster, the data being one of requested and predicted to be requested by the second cache.

20. The system of claim 19, wherein the cache intervention incurs a cache intervention cost, the cache intervention cost being one of measured, computed and predicted using at least one performance metric.

21. The system of claim 20, wherein the at least one performance metric is based on at least one of bandwidth consumption, communication latency, number of message-passing hops, load balance, and power consumption.

22. The system of claim 20, wherein the first cache performs an intervention responsibility offload operation, the intervention responsibility offload operation offloading the intervention responsibility of the memory address for the second cache cluster to a third cache in the at least one other cache cluster.

23. The system of claim 22, wherein the first cache performs the intervention responsibility offload operation, if
(a) the intervention information indicates that the first cache has the intervention responsibility of the memory address for the second cache cluster,
(b) the cache intervention cost of sourcing the data of the memory address from the third cache to the second cache cluster is lower than the cache intervention cost of sourcing the data of the memory address from the first cache to the second cache cluster, and
(c) the first cache sources the data of the memory address to the third cache.

24. The system of claim 22, wherein the first cache performs the intervention responsibility offload operation, if
(a) the intervention information indicates that the first cache has the intervention responsibility of the memory address for the second cache cluster, and
(b) the cache intervention cost of sourcing the data of the memory address from the third cache to the second cache cluster is lower than the cache intervention cost of sourcing the data of the memory address from the first cache to the second cache cluster.

25. The system of claim 20, wherein the first cache performs an intervention responsibility release operation, the intervention responsibility release operation releasing the intervention responsibility of the memory address for the second cache cluster.

26. The system of claim 25, wherein the first cache performs the intervention responsibility release operation, if
(a) the intervention information indicates that the first cache has the intervention responsibility of the memory address for the second cache cluster, and
(b) the corresponding cache line of the memory address is one of replaced and invalidated from the first cache.

27. The system of claim 20, the first cache performs an intervention responsibility acquire operation, the intervention responsibility acquire operation acquiring the intervention responsibility of the memory address for the second cache cluster.

28. The system of claim 27, wherein the first cache performs the intervention responsibility acquire operation, if
(a) no cache in the plurality of cache clusters exists that has the intervention responsibility of the memory address for the second cache cluster, and
(b) the first cache has the lowest cache intervention cost of any cache in the plurality of cache clusters that can source the data of the memory address to the second cache cluster.

29. The system of claim 27, wherein the first cache performs the intervention responsibility acquire operation, if no cache in the plurality of cache clusters exists that has the intervention responsibility of the memory address for the second cache cluster.

30. The system of claim 20, wherein the first cache performs an intervention responsibility intra-cluster transfer operation, the intervention responsibility intra-cluster transfer operation transferring the intervention responsibility of the memory address for the second cache cluster to a third cache in the first cache cluster.

31. The system of claim 30, wherein the first cache performs the intervention responsibility intra-cluster transfer operation, if (a) the intervention information indicates that the first cache has the intervention responsibility of the memory address for the second cache cluster, and (b) the first cache sources the data of the memory address to the second cache.

32. The system of claim 20, wherein an intra-cluster sourcing cache in the first cache cluster is responsible for sourcing data of the memory address to a third cache in the first cache cluster, the data being one of requested and predicted to be requested by the third cache.

33. The system of claim 32, wherein the intra-cluster sourcing cache is the first cache.

34. The system of claim 18, wherein an owner cache in the plurality of cache clusters supplies data of a memory address in the at least one memory address to a second cache cluster in the plurality of cache clusters, if
 (a) the data of the memory address is one of requested and predicted to be requested by the second cache cluster, and
 (b) no cache in the plurality of cache clusters exists that has the intervention responsibility of the memory address for the second cache cluster.

35. The system of claim 18, further comprising a memory operatively associated to the plurality of cache clusters, wherein the memory supplies data of a memory address in the at least one memory address to a second cache cluster in the plurality of cache clusters, if
 (a) the data of the memory address is one of requested and predicted to be requested by the second cache cluster, and
 (b) no cache in the plurality of cache clusters exists that has the intervention responsibility of the memory address for the second cache cluster.

36. The system of claim 18, wherein the intervention information is maintained as an intervention vector for each cache line with shared data, the intervention vector comprises at least one intervention bit, and each of the at least one intervention bit corresponds to each of the at least one other cache cluster; and wherein the each of the at least one intervention bit indicates whether the first cache is responsible for sourcing data of the cache line to the corresponding each of the at least one other cache cluster via a cache intervention.

37. The system of claim 36, wherein the intervention information is compressed and encoded to reduce the storage overhead.

38. The system of claim 37, wherein the intervention information of a cache line is encoded with the state of the cache line.

39. A system of location-aware cache intervention in a computer system, comprising:
 a plurality of caches, comprising a first cache and at least one other cache;
 wherein the first cache maintains location information for at least one memory address, the location information for a memory address in the at least one memory address indicating in which of the at least one other cache, data of the memory address is one of cached and likely to be cached,
 wherein the location information records in which of the at least one other cache the data is valid and indicates respective cache intervention costs of sourcing the data to each of the at least one other cache.

40. The system of claim 39, wherein the first cache is responsible for a cache intervention to source the data of the memory address to a second cache in the at least one other cache, if the first cache determines or predicts based on the location information that the first cache has the lowest cache intervention cost of any of the plurality of caches that can supply the data of the memory address to the second cache.

41. The system of claim 40, wherein the cache intervention cost is one of measured, computed and predicted using at least one performance metric.

42. The system of claim 41, wherein the at least one performance metric is based on at least one of bandwidth consumption, communication latency, number of message-passing hops, load balance and power consumption.

43. The system of claim 39, wherein the first cache performs a location plus update operation, the location plus update operation updating the location information for the memory address to indicate that a second cache in the at least one other cache contains the data of the memory address.

44. The system of claim 43, wherein the first cache performs the location plus update operation, if the first cache observes that the second cache contains the data of the memory address.

45. The system of claim 39, wherein the first cache performs a location minus update operation, the location minus update operation updating the location information for the memory address to indicate that a second cache in the at least one other cache does not contain the data of the memory address.

46. The system of claim 45, wherein the first cache performs the location minus update operation, if the first cache observes that the second cache does not contain the data of the memory address.

47. The system of claim 39, further comprising a memory operatively associated to the plurality of caches, wherein the memory supplies the data of the memory address to a second cache in the plurality of caches, if
 (a) the data of the memory address is one of requested and predicted to be requested by the second cache, and
 (b) no cache in the plurality of caches supplies the data to the second cache via a cache intervention.

48. The system of claim 39, wherein if multiple caches in the plurality of caches supply requested data of the memory address to a second cache in the plurality of caches, the requested data supplied from one of the multiple caches is used by the second cache.

49. The system of claim 39, wherein the location information is maintained as a location vector for each cache line with shared data, the location vector comprises at least one location bit, and each of the at least one location bit corresponds to each of the at least one other cache; and wherein the each of the at least one location bit indicates whether the corresponding each of the at least one other cache contains or likely contains data of the cache line.

50. The system of claim 49, wherein the location information is compressed and encoded to reduce the storage overhead.

51. The system of claim 50, wherein the location information of a cache line is encoded with the state of the cache line.

52. A system of location-aware cache intervention in a computer system, comprising:
- a plurality of cache clusters, comprising a first cache cluster and at least one other cache cluster;
- wherein each of the plurality of cache clusters comprises at least one cache, the first cache cluster comprises a first cache; and
- wherein the first cache maintains location information for at least one memory address, the location information for a memory address in the at least one memory address indicating in which of the at least one other cache cluster, data of the memory address is one of cached and likely to be cached,
- wherein the location information records in which of the at least one other cache cluster the data is valid and indicates respective cache intervention costs of sourcing the data to each of the at least one other cache cluster.

53. The system of claim 52, wherein the first cache is responsible for a cache intervention to source the data of the memory address to a second cache cluster in the at least one other cache cluster, if the first cache determines or predicts based on the location information that the first cache has the lowest cache intervention cost of any cache in the plurality of cache clusters that can supply the data of the memory address to the second cache cluster.

54. The system of claim 53, wherein the cache intervention cost is one of measured, computed and predicted using at least one performance metric.

55. The system of claim 54, wherein the at least one performance metric is based on at least one of bandwidth consumption, communication latency, number of message-passing hops, load balance and power consumption.

56. The system of claim 52, wherein the first cache performs a location plus update operation, the location plus update operation updating the location information for the memory address to indicate that a second cache cluster in the at least one other cache cluster contains the data of the memory address.

57. The system of claim 56, wherein the first cache performs the location plus update operation, if the first cache observes that the second cache cluster contains the data of the memory address.

58. The system of claim 52, wherein the first cache performs a location minus update operation, the location minus update operation updating the location information for the memory address to indicate that a second cache cluster in the at least one other cache cluster does not contain the data of the memory address.

59. The system of claim 58, wherein the first cache performs the location minus update operation, if the first cache observes that the second cache cluster does not contain the data of the memory address.

60. The system of claim 52, further comprising a memory operatively associated to the plurality of cache clusters, wherein the memory supplies the data of the memory address to a second cache cluster in the plurality of cache clusters, if
- (a) the data of the memory address is one of requested and predicted to be requested by the second cache cluster, and
- (b) no cache in the plurality of cache clusters supplies the data to the second cache cluster.

61. The system of claim 52, wherein if multiple caches in the plurality of cache clusters supply requested data of the memory address to a second cache cluster in the plurality of cache clusters, the requested data supplied from one of the multiple caches is used by the second cache cluster.

62. The system of claim 52, wherein the location information is maintained as a location vector for each cache line with shared data, the location vector comprises at least one location bit, and each of the at least one location bit corresponds to each of the at least one other cache cluster; and wherein the each of the at least one location bit indicates whether the corresponding each of the at least one other cache cluster one of contains and likely contains data of the cache line.

63. The system of claim 62, wherein the location information is compressed and encoded to reduce the storage overhead.

64. The system of claim 63, wherein the location information of a cache line is encoded with the state of the cache line.

65. A system for location-aware cache intervention in a computer system, comprising:
- a plurality of caches, comprising a first cache, a second cache and at least one other cache;
- wherein if the first cache receives a data request from the second cache, the first cache supplies the requested data to the second cache via a cache intervention if (a) the first cache has the requested data, and (b) snoop responses from the at least one other cache indicate that the cache intervention cost of supplying the requested data from the first cache to the second cache is lower than the cache intervention cost of supplying the requested data from any of the at least one other cache to the second cache,
- wherein each snoop response includes an intervention vector and the snoop responses indicate the second cache has the lower cost when an intervention bit corresponding to the second cache in the combined intervention vectors is set.

66. The system of claim 65, wherein the cache intervention cost is one of measured, computed and predicted using at least one performance metric.

67. The system of claim 66, wherein the at least one performance metric is based on at least one of bandwidth consumption, communication latency, number of message-passing hops, load balance and power consumption.

68. The system of claim 65, wherein the snoop responses from the at least one other cache are sent directly to the first cache.

69. The system of claim 65, further comprising a snoop response combining component, the snoop response combining component collecting the snoop responses from the at least one other cache, generating a combined snoop response, and sending the combined snoop response to the first cache.

70. The system of claim 65, further comprising a unidirectional ring that is used for collecting the snoop responses from the at least one other cache, generating a combined snoop response, and sending the snoop response to the first cache.

71. A method of location-aware cache intervention in a computer system, comprising the steps of:
- a first cache receiving a data request from a second cache;
- the first cache determining whether the first cache has a lowest cache intervention cost of any cache that can source requested data to the second cache; and
- the first cache supplying the requested data to the second cache via a cache intervention, if the first cache determines that the first cache has the lowest cache intervention cost of any cache that can source the requested data to the second cache,
- wherein the first cache determines the first cache has the lowest cache intervention costs by examining parts of intervention information that respectively correspond to a different one of the cache, wherein the intervention information is maintained by the first cache.

72. The method of claim 71, wherein the determining is based on information collected from cache snoop responses.

73. The method of claim 71, wherein the cache intervention cost comprises at least one performance metric.

74. The method of claim 73, wherein the at least one performance metric is based on at least one of bandwidth consumption, communication latency, number of message-passing hops, load balance, and power consumption.

75. A machine-readable medium having instructions stored thereon for execution by a processor to perform a method of location-aware cache intervention in a computer system, the method comprising the steps of:

a first cache receiving a data request from a second cache;
the first cache determining whether the first cache has a lowest cache intervention cost of any cache that can source requested data to the second cache; and
the first cache supplying the requested data to the second cache via a cache intervention, if the first cache determines that the first cache has the lowest cache intervention cost of any cache that can source the requested data to the second cache,
wherein the first cache determines the first cache has the lowest cache intervention costs by examining parts of intervention information that respectively correspond to a different one of the cache, wherein the intervention information is maintained by the first cache.

* * * * *